United States Patent

Urbansky

[11] Patent Number: 5,555,262
[45] Date of Patent: Sep. 10, 1996

[54] TRANSMISSION SYSTEM OF THE SYNCHRONOUS DIGITAL HIERARCHY

[75] Inventor: Ralph Urbansky, Nürnberg, Germany

[73] Assignee: Lucent Technologies Inc., Murray Hill, N.J.

[21] Appl. No.: 522,800

[22] Filed: Sep. 1, 1995

Related U.S. Application Data

[63] Continuation of Ser. No. 152,565, Nov. 12, 1993, abandoned.

[30] Foreign Application Priority Data

Nov. 19, 1992 [DE] Germany .......................... 42 38 899.6

[51] Int. Cl.⁶ ...................................................... H04J 3/06
[52] U.S. Cl. ........................................... 370/102; 370/112
[58] Field of Search ............................... 370/84, 82, 83, 370/112, 99, 110.1, 95.1, 105.1, 95.3, 100.1, 102, 108, 60, 60.1, 58.1–58.3; 359/115, 118, 135

[56] References Cited

U.S. PATENT DOCUMENTS

| | | |
|---|---|---|
| 4,967,405 | 10/1990 | Upp et al. ............................... 370/58.1 |
| 5,060,229 | 10/1991 | Tyrrell et al. ............................. 370/99 |
| 5,111,485 | 5/1992 | Serack ...................................... 370/101 |
| 5,172,376 | 12/1992 | Chopping et al. .................... 370/100.1 |
| 5,257,261 | 10/1993 | Parruck et al. .......................... 370/112 |
| 5,343,476 | 8/1994 | Urbansky ................................ 370/102 |
| 5,369,653 | 11/1994 | Kuroda ................................... 371/67.1 |

FOREIGN PATENT DOCUMENTS 0407851 1/1991 European Pat. Off. .

*Primary Examiner*—Douglas W. Olms
*Assistant Examiner*—Ajit Patel
*Attorney, Agent, or Firm*—Christopher N. Malvone

[57] ABSTRACT

The invention relates to a transmission system comprising at least a transmission device for exchanging transport modules in signals of a synchronous multiplex hierarchy which signals have a frame structure of columns and rows. The transmission device (5) comprises at least an adapter circuit (5) and a switching network (5). The adapter circuit (5) is provided to delay at least a higher-order transport module up to a given position in the adapted frame structured signal. The switching network comprises at least a time stage provided to write and identify column by column the bytes to be stored of an adapted frame structured signal and to read out the bytes identified column by column in a given order to form at least an outgoing frame structured signal.

11 Claims, 5 Drawing Sheets

TRANSMISSION SYSTEM OF THE SYNCHRONOUS DIGITAL HIERARCHY

This is a continuation of application Ser. No 08/152,565, filed Nov. 12, 1993 now abandoned.

BACKGROUND OF THE INVENTION

The invention relates to a transmission system comprising at least a transmission device for exchanging transport modules in signals of a synchronous multiplex hierarchy, which signals have a frame structure of columns and rows, by means of a switching network.

The invention likewise relates to a transmission device for this transmission system.

A synchronous multiplex hierarchy makes it possible to combine, divide, reroute, or enter arbitrary signal groups in a memory in a transmission system. Examples of a synchronous multiplex hierarchy are SONET and the Synchronous Digital Hierarchy. For example, the plesiochronous datachannel signal streams (in Europe: 2 Mbit/s, 34 Mbit/s and 140 Mbit/s) arriving at a transmission device can be edited with a mapping instruction, so that they are always transmitted in a uniform synchronous transport module frame (STM-1 frame) 125 µs in length as an STM-1 signal at a bit rate of 155.52 Mbit/s over the transmit path. Such a network junction may also receive and further process the higher bit rate STM-N signals (N =4,16, . . . ) resulting from multiplexed STM-1 signals.

The STM-1 signal is structured in frames and comprises, in addition to the actual payload of the signal, control indication bits and justification data. An STM-1 frame comprises 270 columns and 9 rows ( 270 bytes per row). The rows 1 to 3 and 5 to 9, in all the columns 1 to 9 carry the section over head (SOH) for control indication bytes and error detection information bytes and the rest of the structure (AU-payload) carries data of the signal, justification data and further overhead bytes.

A plurality of different containers (C-4, C-3, C-2, C-12 and C-11) can be accommodated in the AU-payload. A container is understood to mean the basic unit for carriage of digital payload. For example, an STM-1 frame can comprise an administrative unit AU-4 with a container C-4 for data blocks of a signal having a bit rate of 139.264 Mbit/s. Alternatively, it is possible that three administrative units AU-3 are accommodated in the STM-1 frame. For example, one administrative unit AU-3 thereof comprises a container C-3 for data blocks of a signal having a bit rate of 44.736 Mbit/s. The second administrative unit AU-3 can comprise, for example, seven tributary unit groups TUG-2 having each one container C-2 for data blocks of a signal having a 6.312 Mbit/s bit rate. Seven TUG-2s having each three containers C-12 for data blocks of a signal having a bit rate of 2.048 Mbit/s can further be mapped into the third administrative unit AU-3.

By appending control indication bits, containers become virtual containers (for example, VC-4, VC-3, VC-2, VC-12, VC-11 in an STM-1 signal), and by appending pointer bytes and justification indication bytes specific virtual containers (for example, VC-3, VC-2, VC-12, VC-11 in an STM-1 signal) become tributary units (for example, TU-3, TU-2, TU-12, TU-11, in an STM-1 signal). Specific virtual containers and tributary units will be referenced transport modules in the following. A transport module is understood to mean virtual containers that have not been mapped into further virtual containers (e.g. VC-4 into AU-4 and VC-3 into AU-3 in an STM-1 signal) and also tributary units (e.g. TU-3, TU-2, TU-12, TU-11 in an STM-1 signal).

The transport modules can be classified in higher-order and lower-order transport modules. A higher-order transport module is understood to mean a transport module that comprises lower-order transport modules and does not form part of a further transport module. A lower-order transport module is contained in a higher-order transport module. With an STM-1 signal, for example the virtual container VC-4 contained in an AU-4 or a virtual container VC-3 contained in an AU-3 is denoted a higher-order transport module. Lower-order transport modules in an STM-1 signal are the TU-3, TU-2, TU-12 and TU-11.

EP-A2-0 407 851 has disclosed said transmission system. The system comprises a plurality of transmission devices (cross connectors) which extract or map various transport modules of an STM-1 signal by means of a switching network, or assembles STM-1 signals. For this purpose is used an additional frame structure (frame structured auxiliary signal) different from the STM-1 frame.

It is an object of the invention to provide a transmission system which makes an exchange possible of transport modules in signals of the synchronous hierarchy in another manner.

This object is achieved in a transmission system of the type defined in the opening paragraph, in that at least an adapter circuit is provided to delay at least a higher-order transport module up to a given position in the adapted frame structured signal and in that the switching network comprises at least a time stage provided to write and identify column by column the bytes to be stored of an adapted frame structured signal and to read out the bytes identified column by column in a given order to form at least an outgoing frame structured signal.

The transmission system according to the invention transmits frame structured signals of the Synchronous Digital Hierarchy. In at least one transmission device of the transmission system lower-order transport modules of at least a frame structured signal are exchanged or also mapped into another frame structured signal. For this purpose, an adaptation of the frame format is first carried out in an adapter circuit associated to a frame structured signal. A higher-order transport module is then delayed for such a period of time that the higher-order transport module takes up a predetermined position in the frame. For example, a virtual container VC-4 (higher-order transport module) can be delayed for such a long time that the first byte of the VC-4 lies in the first row and the tenth column of the STM-1 frame. With such an. adaptation of the frame format the bytes of a lower-order transport module can be detected in a simple manner. For as a result of this adaptation only bytes of a lower-order transport module occur in certain columns of the STM-1 frame. The new frame structured signal to be formed can then be compiled in a simple manner in the switching network by taking certain columns of at least an adapted signal. In the switching network the bytes of an adapted frame structured signal are therefore written each time in a time stage and identified column by column. The bytes are then read out in a given order.

The bytes for the section over head (SOH) may also be given by the switching network or alternatively be compiled in another circuit.

In addition to an adaptation of the frame format, also a synchronization is carried out in the adapter circuit, because there are usually frequency fluctuations between the clock signal (write clock signal) derived from the incoming frame structured signal and the local clock signal (read clock signal). The adapter circuit is provided to comprise a buffer arrangement for synchronizing the frame structured signal to be written which is coupled to a write clock signal, and for synchronizing the frame structured signal to be read out which is coupled to a read clock signal, and to include a control circuit for inserting justification bytes into the lower-order transport modules of the frame structured signal to be read out in the event of a difference between write clock signal frequency and read clock signal frequency. A synchronization is thus realised by inserting justification bytes into the frame structured signal to be read out from the buffer. There is a positive justification action if the read clock signal is larger than the write clock signal. With a reversed ratio there is a negative justification action. With a positive justification action data gaps are inserted. With a negative justification action a payload byte is transported in lieu of a data gap.

To delay a higher-order transport module in the adapter circuit at least up to a given position, justification bytes (data gaps) are inserted when the adapted frame structured signal is compiled. When a higher-order transport module is synchronized and delayed, a virtual container in a lower-order transport module may be shifted in such a way that the delay of the lower-order transport module between the frame structured signal fed to the adapter circuit and the adapted frame structured signal is smaller than the delay of the higher-order transport module.

It is not only possible to exchange transport modules of various frame structured signals, but also bytes of lower-order transport modules can be extracted or mapped into an STM-1 signal. The space stage of the switching network is then provided to transport

- the bytes of frame-synchronized signals produced by the time stages at specific outputs of the space stage to compile outgoing frame structured signals,
- the bytes of a transport module produced by a time stage at a specific output of the space stage to compile a signal with bytes of a lower-order transport module, and
- a signal to be received comprising a transport module at an output of the space stage to map the bytes of the transport module into an outgoing frame structured signal.

With this embodiment lower-order transport modules are exchanged between at least two frame structured signals. The space stage contained in the switching network provides that the incoming bytes of a time stage are presented at specific outputs of the space stage. Such an output presents either a newly compiled frame structured signal or a signal comprising bytes of a transport module, which signal has the same bit rate as the frame structured signal. Besides the bytes of the transport module there are also data gaps in the signal. In a subsequent circuit the data gaps can be largely removed. For example, the transport module contained in an STM-1 signal having a bit rate of about 155 Mbit/s can be accommodated in a signal having a bit rate of about 2 Mbit/s by means of a buffer.

Furthermore, bytes of a transport module may also be mapped into a frame structured signal. For this purpose, the associated bytes of the transport module are presented at the output of the space stage which supplies the frame structured signal.

If the frame structured signal is an STM-1 signal, an adapter circuit is used either to delay a virtual container VC-4 or a virtual container VC-3 in an administrative unit AU-3 up to a given position in the STM-1 frame. The higher-order transport modules in the STM-1 signal are thus the virtual container VC-4 and the virtual container VC-3, if they are mapped into an administrative unit AU-3. A virtual container VC-3 which is mapped into a TU-3 is not associated to the higher-order transport modules. The TU-3 is to be considered a lower-order transport module.

In an embodiment of the switching network it is provided that a time stage of the switching network comprises a detection circuit for recognizing the beginning of a frame of an STM-1 signal, a memory circuit to buffer bytes of an STM-1 signal, a write address generator controlled by the detection circuit and a read address generator controlled by the detection circuit and in that the switching network comprises a setting circuit for producing the order in which the bytes are to be read out from the memory circuit and the connecting lines for the space stage.

The write address generator controlled by the detection circuit comprises a first counter arrangement with a column counter for supplying addresses for the write operation of the memory circuit. Once the detection circuit has detected the beginning of an STM-1 frame, it sets the column counter arranged, for example, as a modulo counter of the first counter arrangement to an initial value. The value of 270 may be selected as the modulo factor, which value corresponds exactly to the number of columns of an STM-1 frame.

The read address generator likewise controlled by the detection circuit comprises a second counter arrangement with a column counter and a first Table memory. The second counter arrangement is provided to supply addresses for the first Table memory. The first Table memory is used for translating an address supplied by the second counter arrangement into a specific stored address for the read process of the memory circuit. The setting circuit is provided to feed the translation Table to the first Table memory.

The detection circuit sets the column counter arranged as a modulo counter of the second counter arrangement to an initial value once the circuit has detected the beginning of an STM-1 frame. The value of 270 can be selected as a modulo factor, which exactly corresponds to the number of columns of an STM-1 frame.

A setting value generator is used for controlling the space stage of the switching network. This generator controlled by the detection circuit of a time stage comprises a third counter arrangement with a column counter and a second Table memory. The counter arrangement is provided to, supply addresses for the second Table memory. The second Table memory is intended for the translation of an address supplied by the counter arrangement into specific setting values for the connecting lines of the space stage. The setting circuit is additionally used for feeding the translation Table to the second Table memory. In the space stage of the switching network the connecting lines are switched column by column. Setting values supplied by a second Table memory are used to set the connecting lines. The second Table memory translates the addresses supplied by the third counter arrangement on the basis of its stored translation Table.

Furthermore, the first counter arrangement and the first Table memory are only provided to supply least significant bits of the counter or memory value. On the basis of repetitive columns of a lower-order transport module (e.g. 3 columns are each time assigned to 84 TU-11, 4 columns are each time assigned to 63 TU-12), the memory circuit may comprise a time stage of 180 memory locations (2*90 columns) in lieu of 540 memory locations (2*270 columns).

The section overhead (SOH) may be given by the transmission device or newly assembled in a parallel arranged device. If the SOH is newly assembled in a parallel arranged device, the SOH bytes are not stored in the memory circuit of a time stage. Therefore, the first, second and third counter arrangements further include a row counter, an evaluation circuit and a release circuit. The row counter controlled by the column counter and the column counter are provided to supply their counts to the evaluation circuit. The evaluation circuit is used for supplying a release value to the release circuit at least if there is no SOH present. The release circuit is intended to release an address supplied by the column counter if a release value is available.

SUMMARY OF THE INVENTION

An exemplary embodiment of the invention will be further explained with reference to the drawing Figures, in which:

FIG. 1 shows a transmission system for transmitting signals of the Synchronous Digital Hierarchy, FIG. 2 shows a block circuit diagram of a transmission device used in the transmission system shown in FIG. 1, FIG. 3 gives a diagrammatic representation of two consecutive STM-1 frames, FIG. 4 shows a block circuit diagram of an adapter circuit used in FIG. 2, FIG. 5 shows an STM-1 signal to be written in the adapter circuit shown in FIG. 4 and an STM-1 signal to be read from the adapter circuit shown in FIG. 4, FIG. 6 shows a block circuit diagram of a switching network used in FIG. 2, FIG. 7 shows a block circuit diagram of a time stage used in the switching network shown in FIG. 6, and FIG. 8 shows a block circuit diagram of a counter arrangement used in the switching network shown in FIG. 7.

DETAILED DESCRIPTION OF THE PREFERRED EMBODIMENTS

Figure 1:
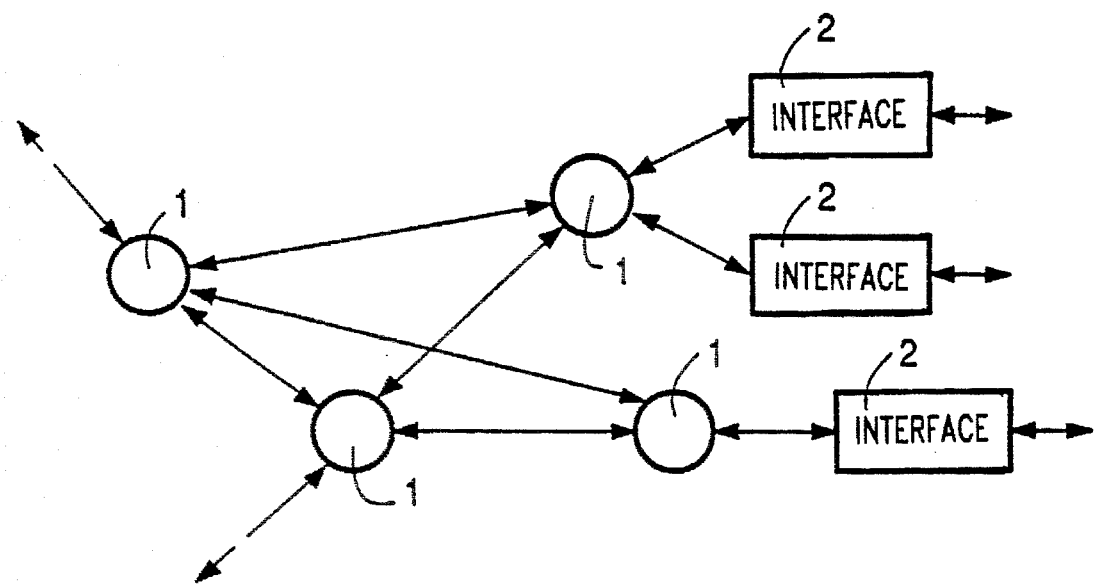

The transmission system for the Synchronous Digital Hierarchy as shown in FIG. 1 comprises a plurality of transmission device 1 which are coupled to one another partly by connecting lines. Such a transmission device 1 receives and sends at least one STM-1 signal. Furthermore, the transmission device 1 can receive, for example, signals from interface circuits 2 or send signals thereto. Such an interface circuit 2 receives, for example, a signal having a lower-order transport module of an STM-1 signal. In the interface circuit 2 this signal is adapted to the STM-1 frame format and sent to the transmission device 1. Conversely, data gaps are removed from a received signal comprising a lower-order transport module and this signal is transported at a lower bit rate.

Figure 2:
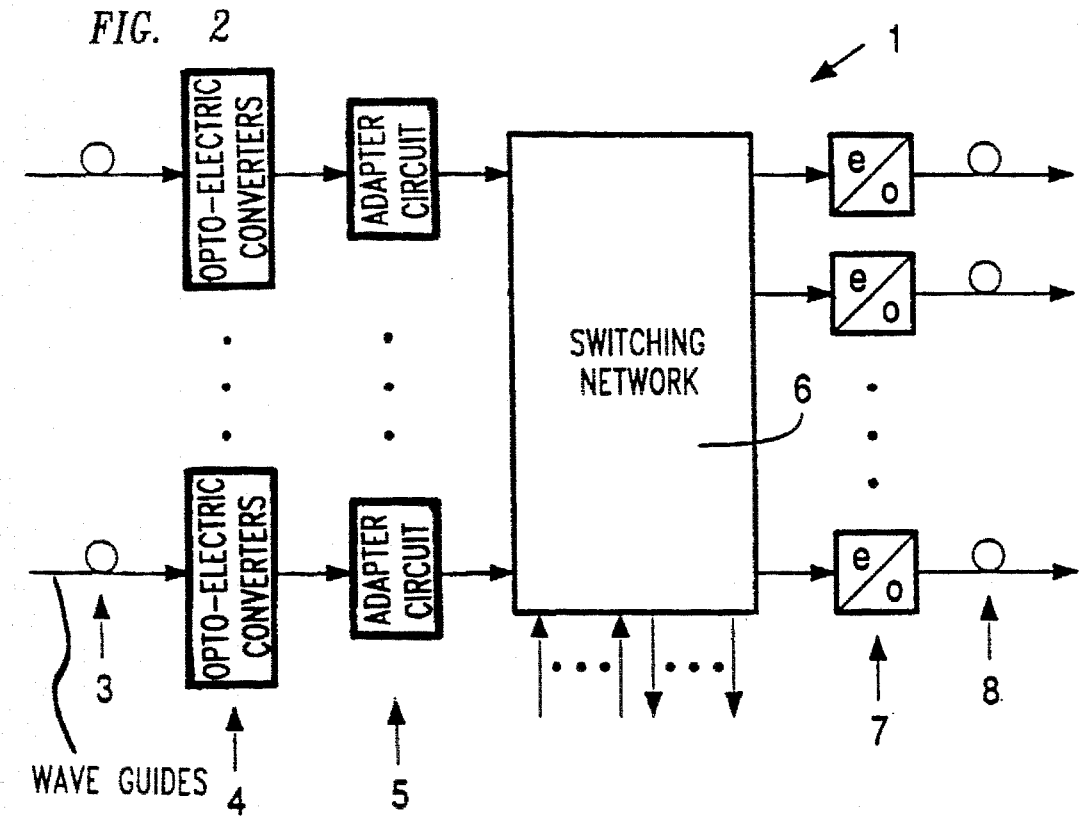

A block circuit diagram of a transmission device 1 is shown in FIG. 2. This transmission device 1 is supplied with STM-1 signals through a plurality of light waveguides 3. An optoelectrical converter 4 converts these optical signals into electric signals. Each subsequent adapter circuit 5 adapts the frame format of the frame structured STM-1 signal. The adapted STM-1 signals coming from the adapter circuits 5 are applied to a switching network 6 which receives signals having lower-order transport modules from an interface circuit 2 or takes signals having lower-order transport modules that were previously extracted from an STM-1 signal to an interface circuit 2. In addition, lower-order transport modules from one STM-1 signal are mapped into another STM-1 signal. These newly compiled STM-1 signals are applied to electrooptical converters 7 which form optical signals from the electric signals. The optical signals are then further transported through light waveguides 8.

Figure 3:
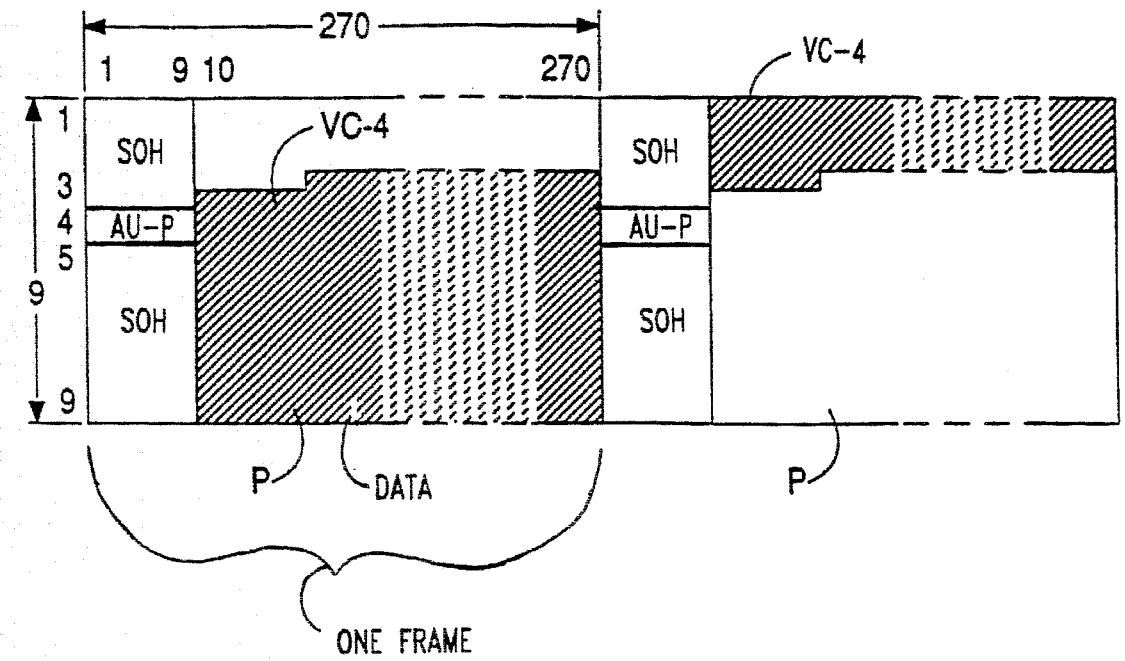

The STM-1 signal has a frame structure and, in addition to the actual payload of the signal, comprises control indication bits and justification data. Two successive STM-1 frames are shown in FIG. 3. An STM-1 frame comprises 270 columns and 9 rows (270 bytes per row). The rows 1 to 3 and 5 to 9 in the first 9 columns carry the section over head (SOH) and row 4 carries the AU-pointer (AU-P). The rest of the structure (AU-payload structure P), in the columns 10 to 270, carries payload bytes, justification bytes and further bytes for control indication bits. The AU-pointer carries information about the first bit of a virtual container VC-4 in an administrative unit AU-4, or VC-3 in an administrative unit AU-3. In FIG. 3 such a VC-4 is shown in two successive frames. This VC-4 begins at an arbitrary position in the payload structure in the first STM-1 frame and ends in the second successive STM-1 frame.

Such a VC-4 may comprise, for example, three tributary unit groups (TUG-3). The VC-4 comprises in the first seven columns a path overhead (POH) and fixed justification bytes in the two next columns. Starting from column 4 of the AU-payload structure P, columns of the three TUG-3 are alternatively mapped.

A TUG-3 comprises 86 columns with fixed justification bytes in the first and second columns. The rest of the columns of the TUG-3 carry bytes of transport modules TU-2, TU-12 or TU-11. For example, each TUG-3 comprises 63 TU-12 with 4 columns each. An STM-1 frame comprises only a quarter of the bytes of a TU-12. The remaining bytes are inserted into three successive frames. A TU-12 transports a virtual container VC-12. The first byte of such a virtual container VC-12 is indicated by the pointer bytes of the TU-12. The pointer bytes denoting the beginning of a VC-12 are carried in the first byte of the first and second quarters of a TU-12.

It is to be noted once more that the transport modules are classified in higher-order and lower-order transport modules. A higher-order transport module in an STM-1 signal is understood to mean, for example, the virtual containers VC-4 which are transported in an AU-4, and the virtual containers VC-3 which are transported in an AU-3. The lower-order transport modules in an STM-1 signal are denoted to mean, for example, the TU-3, TU-2, TU-12 and TU-11.

Figure 4:
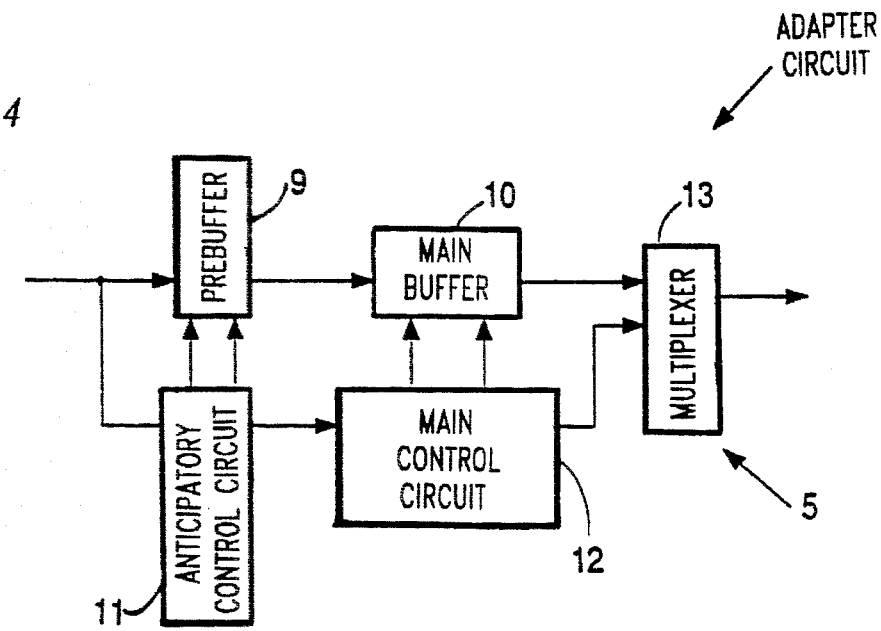

FIG. 4 shows in a block circuit diagram an adapter circuit 5 that can be used in FIG. 2. Such an adapter circuit comprises a buffer arrangement with a prebuffer 9 and a main buffer 10, a control circuit with an anticipatory control circuit 11 and a main control circuit 12 and a multiplexer 13. By means of the prebuffer 9 and the anticipatory control circuit 11 the STM-1 signal written in the prebuffer 9 is synchronized with the STM-1 signal to be read from the prebuffer 9. The anticipatory control circuit 11 comprises a write counter which is docked with a write clock signal derived from the STM-1 signal to be written in the prebuffer 9. A local clock signal, referenced read clock signal, is applied to a read counter also forming part of the anticipatory control circuit 11. The write clock signal and the read clock signal usually have frequency and phase fluctuations. These frequency and phase fluctuations are equalized with the aid of the prebuffer 9 and the anticipatory control circuit 11. Justification bytes are inserted into the STM-1 signal to be read out, as a result of which the STM-1 signal to be read out is synchronized with the written STM-1 signal. Positive justification takes place if the read clock signal is greater than the write clock signal. In that case data gaps are inserted. In the case of negative justification, when the read clock signal is smaller than the write clock signal, a payload byte is transported in lieu of a data gap. The justification bytes are inserted at appropriate locations in the STM-1 frame by means of the main buffer 10, the main control circuit 12 and the multiplexer 13. In addition, the frame format is adapted by the main buffer. The circuit arrangement shown in FIG. 4 is known, for example, from German Patent Application 42 22 546. As has also been denoted in German Patent Application 42 22 546, a buffer arrangement may comprise only one buffer which carries out the functions of both the prebuffer and the main buffer.

When a frame format is adapted, the higher-order transport module is delayed by the insertion of justification bytes until the beginning of a higher-order or of a plurality of higher-order transport modules is situated at one or various specific positions in the STM-1 frame. For example, the first byte of a virtual container VC-4 may be situated in the first row and the tenth column after the frame format has been adapted. The justification bytes produced as a result of the synchronization between the STM-1 signal written in the prebuffer 9 and the STM-1 signal to be read from the prebuffer 9 are only inserted into the lower-order transport modules of the STM-1 signal to be read out. The higher-order transport modules do not have any justification action.

Figure 5A:
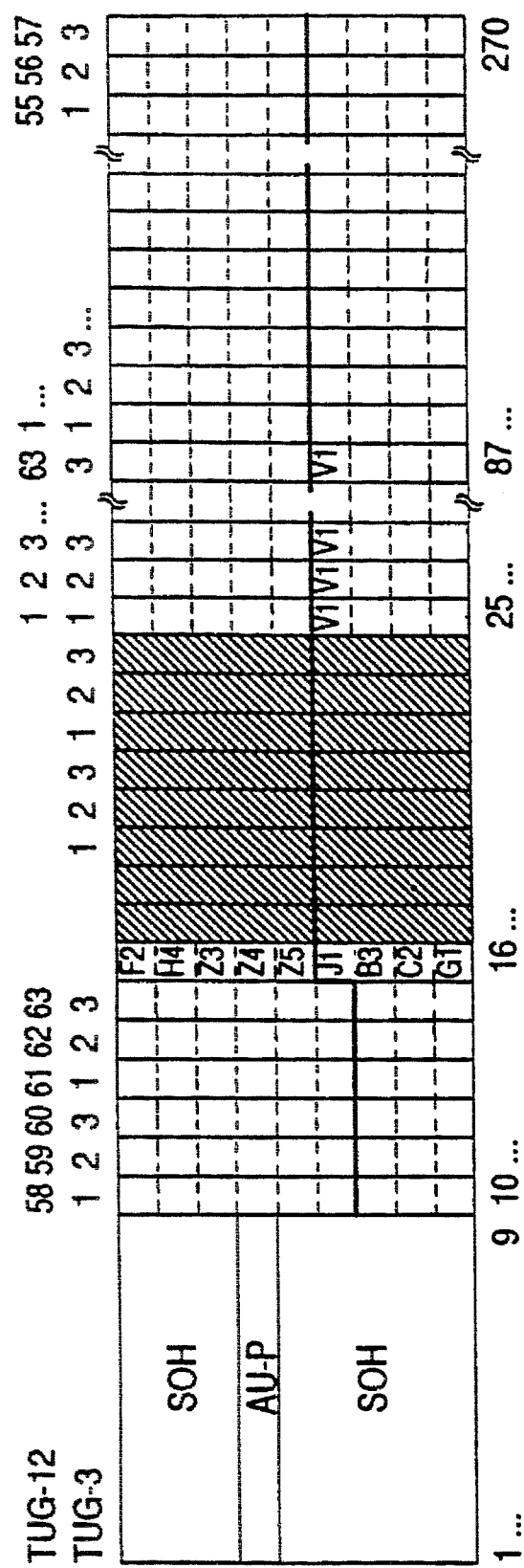

An adaptation of the frame format for a higher-order transport module VC-4 is shown in FIGS. 5. FIG. 5a shows a frame which is to be applied to the adapter circuit 5. The beginning of the VC-4 (J1-byte) lie, s in column 16 and row 6. The virtual container VC-4 comprises three more TUG-3 and each TUG-3 contains 21 TU-12. The first row comprising given data of a TUG-3 begins in column 19 of the STM-1 frame. Column 1 of the second TUG-3 lies in column 20 of the STM-1 frame and column 1 of the third TUG-3 lies in column 21 of the STM-1 frame. Column 3 of the first TUG-3 (column 25 of the STM-1 frame) comprises the beginning of column 1 of the first transport module TU-12. The first byte of this column 1 of the first TU-12 comprises a pointer byte V1. The other three columns of the first transport module TU-12 begin in columns 88, 151 and 214 of the STM-1 frame.

Figure 5B:
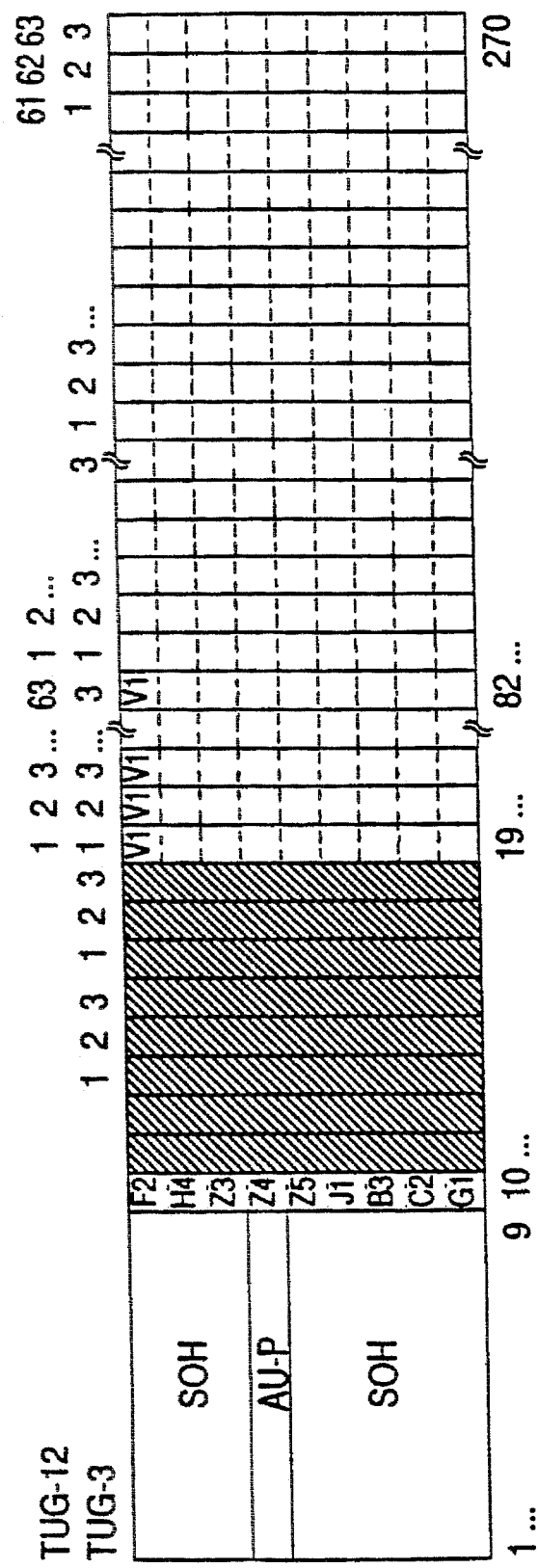

As a result of the adaptation of the frame format the beginning of the higher-order transport module VC-4 lies in column 10 and row 1 (compare FIG. 5b). As a result, column 1 of a first TUG-3 lies in column 13 of the STM-1 frame and column 1 of the first lower-order TU-12 in column 19 of the STM-1 frame. The first TU-12 lies in the STM-1 frame of FIG. 5b in the columns, 19, 82, 145 and 208.

Figure 6:
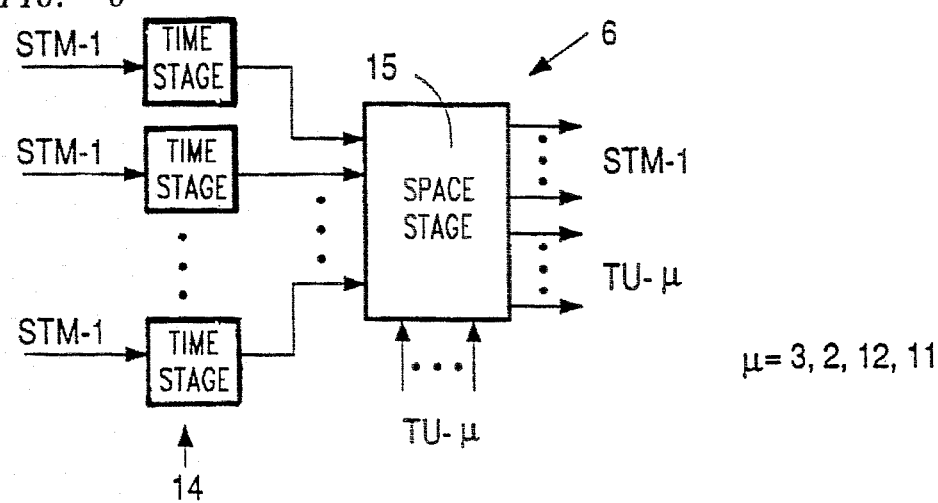

By means of the switching network 6, of which FIG. 6 shows a block circuit diagram, various lower-order transport modules of an STM-1 signal can be mapped into another STM-1 signal, a transport module can be applied to an interface circuit 2 or a transport module supplied by an interface circuit 2 can be mapped into an STM-1 signal. For this purpose the switching network 6 as shown in FIG. 6 comprises a plurality of time stages 14 receiving each an STM-1 signal. The outputs of the time stages 14 are coupled to inputs of a space stage 15. Furthermore, the space stage 15 receives signals comprising lower-order transport modules from an interface circuit 2. Via a plurality of outputs, STM-1 signals and signals comprising lower-order transport modules are produced by the space stage 15.

Figure 7:
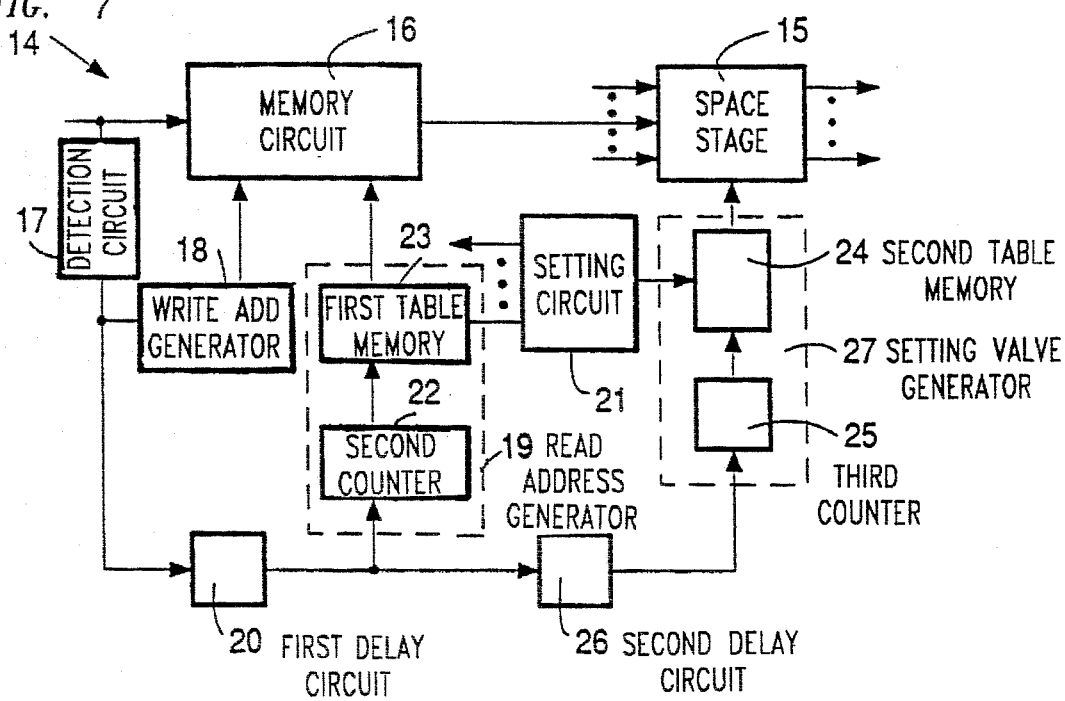

FIG. 7 shows in more detail an exemplary embodiment of a time stage 14 and further switching elements. It represents a memory circuit 16, a detection circuit 17, a write address generator 18, a read address generator 19, two delay circuits 20 and 26, a setting circuit 21 and a setting value generator 27 for the space stage 15. The detection circuit 17 which detects the beginning of an STM-1 frame produces a set signal for a write address generator 18 arranged as a first counter arrangement. The first counter arrangement comprises a column counter counting the columns of an STM-1 frame. The column counter may be a modulo counter with a modulo factor of 270 (270 columns). Once the set signal has been received, the column counter is set to an initial value. The detection circuit 17 is described in more detail for example, in German Patent Application 42 05 959. Furthermore, the detection circuit 17 applies the set signal via a first delay circuit 20 to a second counter arrangement 22 which forms part of the read address generator 19. This second counter arrangement 22 also comprises a column counter which may be a modulo counter with the modulo factor of 270. The delay of the delay circuit 20 is to cancel the delay between write and read operation caused by the memory circuit 16. The write address generator 18 produces addresses for the memory circuit 16 which enters data of the STM-1 signal column by column. As a rule, the memory circuit 16 comprises twice the number of memory cells to avoid time problems during the reading operation.

The column counters in the write address generator 18 and in the read address generator 19 produce a 9-bit address if all the 270 values are to be written in the memory circuit 16. Since a maximum of 84 lower-order transport modules ( 84 TU-11, that is) can be transported in one STM-1 signal, and in this transport variant the columns of the TU-11, are repeated after 84 columns, one memory for storing 90 columns is sufficient. For this reason only part of the least significant bytes of the column counters of the write address generator 18 and read address generator 19 are transported. It is then sufficient that the 7 least significant bits of the address of the column counters are transported.

The bytes of an STM-1 frame written column by column into the memory circuit 16 are read out in a different order. The addresses for the reading operation are supplied by a first Table memory 23 contained in the read address generator 19. The first Table memory 23 translates the addresses supplied by the second counter arrangement 22 into another address. The translation Table has been supplied to the Table memory 23 by a setting circuit 21. Under the control of the read address generator 19 the memory circuit 16 reads out either bytes of a lower-order transport module for another STM-1 frame, or bytes for a new STM-1 signal to be compiled, or bytes for a signal comprising data of a lower-order transport module.

Connecting lines in the space stage 15 are established column by column (byte by byte) between its inputs, which are coupled to memory circuits 16 of the time stages 14, and its outputs. To terminate the connecting lines the space stage 15 is supplied with setting values by an address generator 27 in a column-by-column fashion. The setting value generator 27 comprises a second Table memory 24 and a third counter arrangement 25. The counter arrangement 25 is set to an initial value by a detection circuit 17 of a time stage 14 by means of a setting signal. This setting signal also passes through the first delay circuit 20 and a second delay circuit 26. With these two delay circuits the dwell time in the memory circuit 16 is to be compensated. The counter arrangement 25 comprises a column counter which may be arranged as a modulo counter with a modulo factor of 270. The addresses supplied by the counter arrangement 25 are translated into setting values in the second Table memory 24. The setting values are always produced by the setting circuit 21.

The SOH data of an STM-1 frame may be led via an adapter circuit 5 and the switching network 6. Alternatively, however, if the SOH data are to be changed, it is also possible to supply them through a parallel arranged circuit.

Figure 8:
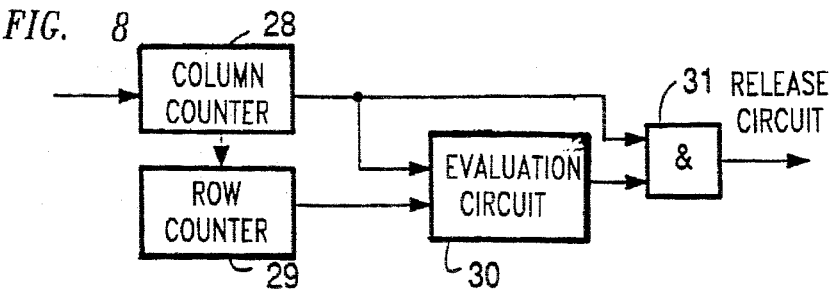

If the SOH data do not run through the switching network 6, no address of the memory circuit 16 or setting value of the space stage 15 is produced at the instant an SOH byte occurs. To stop the counting operation then, the first, second and third counter arrangements 18, 22 and 25 are removed. Such a removal is shown in FIG. 8. The column counter 28 counts the columns of an STM-1 frame (modulo counter with the modulo factor 270). Once the end of a row of a frame has been reached (after 270 addresses), a row counter 29 arranged as a modulo counter with a modulo factor of 9 is incremented. An evaluation circuit 30 receiving the counts from the column counter 28 and the row counter 29 controls a release circuit 31 arranged as an AND-gate. This release circuit 31 releases the evaluation circuit when a release value of "1" is produced by the evaluation circuit 30, so that the address produced by the column counter 28 can be transported. The evaluation circuit 30 may be described by the following program run:

Count of column counter >8?
No: count of row counter =3?
  Yes: release value: =1
  No: release value: =0
Yes: release value: =1.

The column counter 28, whose first address is equal to zero, produces a release value of "1" if the next byte of the STM-1 signal is not an SOH byte. If the next byte is a byte of the AU-pointer (row counter equal to "3"; row counter starts counting at zero), a release value of also "1" is produced (columns 1 to 8, row 4). In the other cases a release value of "0" is applied to the release circuit 31. Alternatively, it is possible that the evaluation circuit 30 does not release further bytes to be written in a memory circuit 16 either.

What is claimed is:

1. A transmission system including a transmission device for transmitting a plurality of transport modules of data in a synchronous multiplex hierarchy, said transport modules including higher-order transport modules, said data arranged in a plurality of columns and rows in a frame structured signal, said transmission device comprising:

adapting means for delaying one of said higher-order transport modules to a predetermined position to generate an adapted frame structure signal; and switching means for writing and identifying said adapted frame structure signal on a column-by-column basis and to read out said adapted frame signal on a column-by-column basis in a predetermined order to form an outgoing frame structured signal.

2. The transmission system of claim 1, wherein said frame structured signal includes a write signal portion and wherein said adapting means includes buffer means for receiving said frame structured signal for synchronizing said frame structured signal to a local clock signal.

3. The transmission system of claim 2, wherein said adapting means includes control means for inserting justification bytes into a lower-order module when a frequency of said write signal is not equal to a frequency of said local clock signal.

4. The transmission system of claim 1, wherein said adapting means includes control means for inserting justification bytes into said higher-order module to delay said higher-order module upto a predetermined position in said frame structure signal.

5. The transmission system of claim 1, wherein said frame structured signal is an STM-1 signal and wherein said adapting means delays a lower-order module to a predetermined position in the STM-1 signal.

6. The transmission system of claim 5, wherein said switching means includes a detection circuit for recognizing the beginning of a frame of said STM-1 signal, a memory circuit to buffer portions of said STM-1 signal, a write address generator responsive to said detection circuit, a read address generator responsive to said detection circuit and a setting circuit coupled to said read address generator to position portions of said STM-1 signal read from said memory circuit.

7. The transmission system of claim 6, wherein said write address generator includes a first counter circuit having a column counter for producing addresses for writing portions of said STM-1 signal to said memory circuit.

8. The transmission system of claim 6, wherein said read address generator includes a second counter circuit including a column counter and a first table memory including a first translation table and wherein said second counter circuit produces addresses of said first table memory for translating an address generated by said second counter circuit into a further address for reading a portion of said STM-1 signal from said memory circuit.

9. The transmission circuit of claim 8, wherein said setting circuit also transmits said translation table in said first table memory.

10. The transmission system of claim 6, wherein said switching means includes a setting value generator responsive to said detection circuit, said setting value generator including a third counter circuit having a column counter and a second table memory having a second translation table, said third counter circuit for supplying addresses to said second table memory for translating an address supplied by said third counter circuit for input lines of a space stage.

11. The transmission system of claim 10, wherein said setting circuit transmits said second translation table to said second table memory.

* * * * *